May 31, 1960    A. J. REMINGER ET AL    2,939,098
POTENTIOMETER DESIGN
Filed March 25, 1959
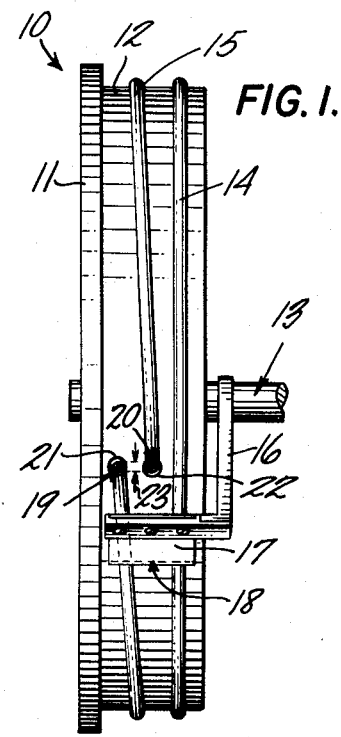
FIG. 1.
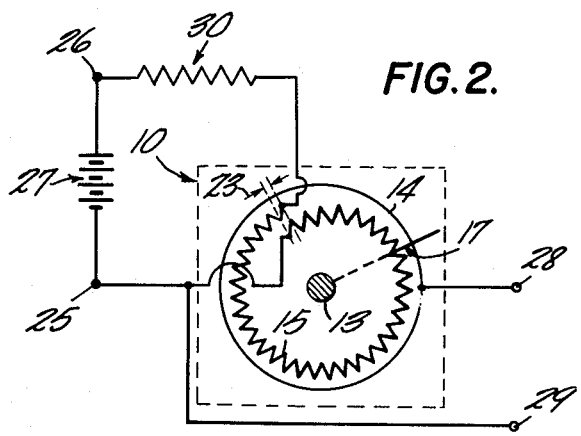
FIG. 2.
FIG. 3.
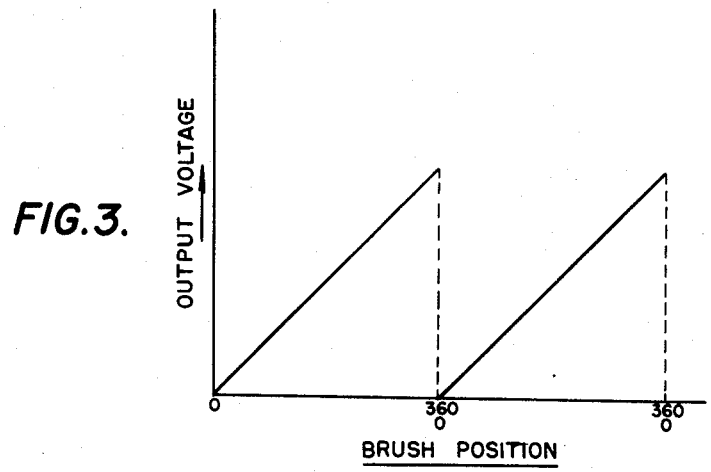
INVENTORS.
AUGUST J. REMINGER &
WARREN M. JANES
BY
their ATTORNEYS.

United States Patent Office 2,939,098
Patented May 31, 1960

2,939,098
POTENTIOMETER DESIGN

August J. Reminger, Irvington, and Warren M. Janes, Dover, N.J., assignors to Vitro Corporation of America, New York, N.Y.

Filed Mar. 25, 1959, Ser. No. 801,879

4 Claims. (Cl. 338—174)

This invention relates to potentiometers and, more particularly, to position indicating potentiometers providing a corresponding signal at every angular position of a drive shaft.

Many position indicating devices and the like require potentiometers capable of generating an electrical signal representing the angular position of a continuously rotatable shaft, for example. Heretofore, no continuous rotation potentiometer utilizing a single turn of resistance wire has been devised without including an open circuit or dead zone at the angular position between the terminal points of the resistance wire.

Accordingly, it is an object of this invention to provide a new and improved continuous rotation position indicating potentiometer having no dead zone.

Another object of the invention is to provide a position indicating potentiometer capable of generating a highly accurate electrical indication of every angular position of a drive shaft.

These and other objects of the invention are attained by arranging the resistance element of the potentiometer with a finite but small overlap at the terminal points and providing a brush adapted to contact both ends of the element at one angular position. Also, a protective resistance selected to prevent damaging current from flowing through the potentiometer is connected in series with the resistance element. In addition, the same brush may be arranged to engage a commutator ring.

Further objects and advantages of the invention will be apparent from a reading of the following description in conjunction with the accompanying drawings in which:

Fig. 1 is a side view showing a typical potentiometer arranged according to the invention;

Fig. 2 is a schematic circuit diagram illustrating the electrical connection of the potentiometer shown in Fig. 1; and Fig. 3 is a graphical illustration showing the potentiometer output signal for various input shaft positions during two cycles of shaft rotation.

In the representative embodiment of the invention shown in Fig. 1, a potentiometer 10 comprises a base member 11 carrying a wire support drum 12 and a rotatable shaft 13 extending axially through the support drum. Around its periphery, which may be provided with suitable grooves for the purpose, the drum carries a continuous circular commutator ring 14 and a single helically wound turn of resistance wire 15.

In order to provide an electrical signal indicating the position of the shaft 13 with respect to the drum 12, the shaft carries a radial arm 16 extending to the periphery of the drum. A brush 17 mounted on the arm 16 is arranged to move adjacent the drum surface to contact both the commutator ring 14 and the resistance wire 15. Preferably, the wire engaging area 18 of the brush 17 is shaped to contact only a very small angular portion of the wire. As is customary in potentiometers of generally cylindrical shape, the ends 19 and 20 of the resistance element 15 are turned inwardly toward the center of the drum 12 through apertures 21 and 22, respectively, or otherwise displaced from the path of the brush and suitable conductors having substantially no resistance lead from the ends 19 and 20 to a voltage source.

In potentiometers arranged according to the invention, the ends 19 and 20 of the resistance wire 15 are positioned to provide a finite but very small amount of overlap, which is indicated in Figs. 1 and 2 by the arrows 23. Although this overlap is as small as possible, it must be sufficient to assure that the brush 17 always engages at least one end of the wire 15 as its moves through the zero angular position from one portion of the wire to the other. It will be readily apparent that the angle of mutual contact can be kept at a minimum by raising one of the end portions 19 or 20 slightly above the other with respect to the surface of the drum 12. As a result, the contact area 18 of the brush 17 can slip easily from one end portion of the wire 15 to the other, being in contact with both portions at only a single angular position.

As shown in the schematic circuit diagram of Fig. 2, the potentiometer 10 is connected through input terminals 25 and 26 to a voltage source which is schematically indicated in the drawing as a battery 27. In addition, two output terminals 28 and 29 are provided and one terminal 28 is electrically joined to the commutator ring 14 while the other is connected to the input terminal 25.

In order to prevent the ends of the resistance element 15 and the brush 17 from becoming overheated when the brush is in contact with both end portions 19 and 20 thus shorting out the resistance of the element, a current limiting resistor 30 is included in series between the element 15 and that input terminal 26 which is not joined to an output terminal. The size of the current limiting resistor 30 is selected in combination with the supply voltage so that the current passing through the potentiometer when the resistance of the element 15 is short-circuited does not exceed the capacity of the brush and the end portions 19 and 20 of the element. On the other hand, the voltage of the source 27 and the resistor 30 are also selected to provide the required voltage drop across the resistance element 15 when it is not shorted out by the brush.

As an example, assume that the output voltage for the potentiometer is to be one-tenth volt per degree of angle of the shaft 13 and the current capacity of the brush 17 and the end portions of the element 15 is one-tenth ampere. In this case, the voltage drop across the element 15 should normally be thirty-six volts and the value of the current limiting resistor 30 must be ten times the voltage of the source. Accordingly, if the total resistance of the element 15 is 720 ohms, it can be shown that the resistor 30 must also be 720 ohms if the supply voltage is 72 volts. On the other hand, if the resistance of the element 15 is 1080 ohms, the resistor 30 should be 540 ohms if the supply is 54 volts.

In operation, as shown in Fig. 3, rotation of the shaft 13 clockwise, as viewed in Fig. 2, carries the brush 17 away from the zero position increasing the output voltage at the terminals 28 and 29 at a constant rate. When the brush 17 reaches the 360° position, it contacts both end portions of the element 15 shorting out the element so that zero voltage is supplied across the output terminals 28 and 29. In this condition, if the voltage of the source 27 and the resistor 30 have been selected in the manner described above, a current which is insufficient to cause any damage, such as one-tenth ampere, flows through the brush 17 and the ends 19 and 20 of the resistance element. Further angular motion of the shaft 13 in the clockwise direction increases the output voltage at a constant rate in the same manner as before.

Although the invention has been described herein with reference to a specific embodiment, many modifications and variations therein will readily occur to those skilled in the art. Accordingly, all such variations and modifications are included within the intended scope of the invention as defined by the following claims.

We claim:

1. A continuous rotation potentiometer comprising generally circular support means, a resistance element mounted on the support means in the form of an open loop having adjacent end portions overlapping by a very small angle, and rotary brush means movable along the resistance element and arranged to contact both end portions in at least one position.

2. A continuous rotation potentiometer comprising generally circular support means, a resistance element mounted on the support means in the form of an open loop having adjacent end portions overlapping by a very small angle, commutator ring means also mounted on the support means and forming a closed loop, and rotary brush means movable along the commutator ring means and the resistance element and arranged to contact both end portions in at least one position.

3. A continuous rotation potentiometer comprising generally cylindrical support means, a resistance element mounted on the periphery of the cylinder in the form of an open helical loop having adjacent end portions overlapping by a very small angle, commutator ring means mounted on the periphery of the support means, and brush means rotatably mounted on the support means movable along the commutator ring means and the resistance element and arranged to contact both end portions in at least one position.

4. A continuous rotation potentiometer comprising generally circular support means, a resistance element mounted on the support means in the form of an open loop having adjacent end portions overlapping by a very small angle, and brush means movable along the resistance element and arranged to contact both end portions in at least one position, one of the end portions being displaced slightly from the other end portion with respect to the surface of motion of the brush means.

References Cited in the file of this patent

UNITED STATES PATENTS

| | | |
|---|---|---|
| 2,073,948 | Schofield | Mar. 16, 1937 |
| 2,371,159 | Erb | Mar. 13, 1945 |
| 2,729,728 | Koenig | Jan. 3, 1956 |